United States Patent Office 2,801,006
Patented July 30, 1957

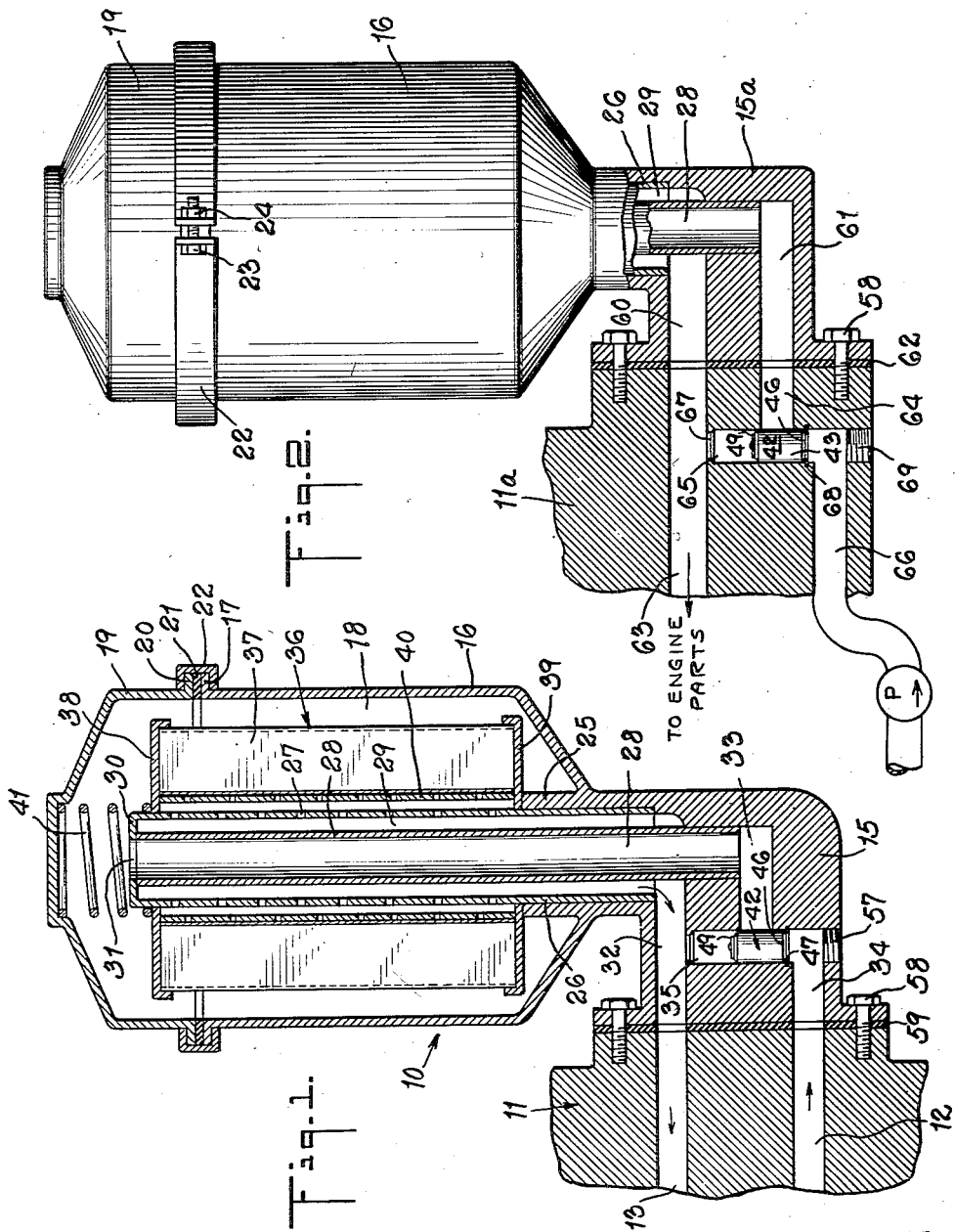

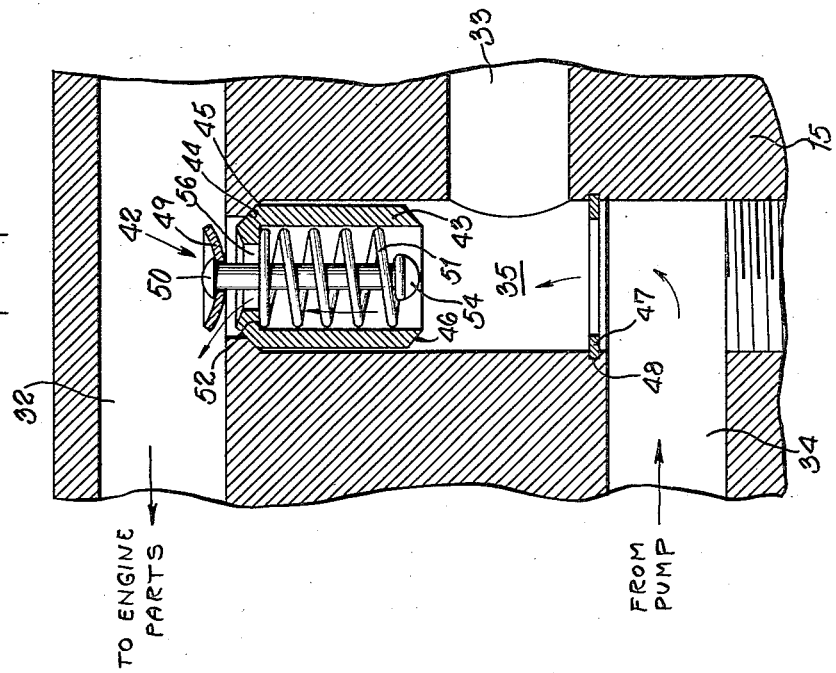
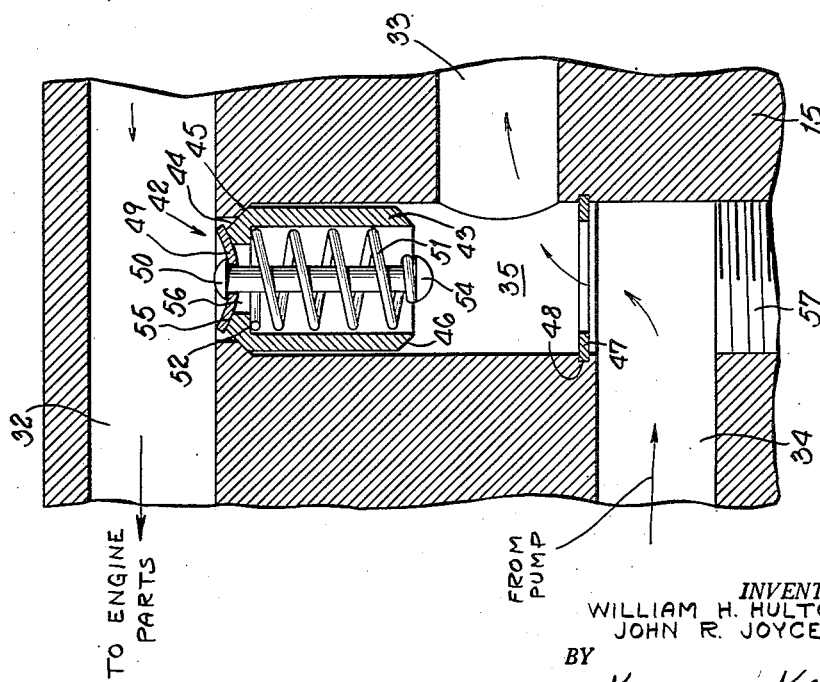

2,801,006

COMBINATION VALVING ARRANGEMENT FOR OIL FILTER SYSTEMS

William H. Hultgren, Readington, and John R. Joyce, Union, N. J., assignors to Purolator Products, Inc., Rahway, N. J., a corporation of Delaware Application January 7, 1954, Serial No. 402,666

9 Claims. (Cl. 210—133)

This invention relates to full-flow oil filter systems of automotive engine installations and more particularly to a combination valving arrangement that will function to prevent drain-back of oil from the engine to the oil sump and oil pump when the engine is at rest and also function to insure lubrication of engine parts in the event of clogging of the filter of the system by then permitting the oil to by-pass the filter.

In certain automotive engine installations, the filter is secured to a base and the latter is mounted directly to the engine block. Flow passageways, channels or ducts are provided both in the base and in the engine block with appropriate of the ducts in registry so that oil may be pumped from the engine through the filter and the filtered oil delivered to engine parts for lubrication. Such an installation by way of example is shown in Kovacs U. S. Patent No. 2,639,783, issued May 26, 1953. In installations of the kind in question the stopping or shutting down of the engine has introduced a problem, namely, drain-back or return flow into the pump and sump of oil from moving parts of the engine, for example, its bearings, shafts, etc. as well as of oil from the filter. This results in an initial lack of oil for lubrication of these moving parts until the oil pressure has been built up sufficiently again on restarting of the engine to recirculate the oil to the necessary lubrication points. This is detrimental to the engine because its moving parts lack sufficient lubrication for a long enough time to be damaged.

Objects and features of this invention are to provide a simple automatically operable valving arrangement to prevent the undesired drain-back of oil to the sump when the engine is at rest.

Further objects and features of the invention are to provide structure in this valving arrangement which will function to permit oil to by-pass the filter whenever the filter element is clogged, thus eliminating the need for a separate valve, as is usually required for by-pass purposes.

Other objects and features of the invention are the provision of a valving arrangement for the intended purposes that is simple and inexpensive to manufacture, install and operate.

Further objects and features of the invention are the provision of a valving arrangement for the intended purposes that may be incorporated either in the base of the filter or in the engine block itself as may be desired.

Other objects and features of the invention will become apparent from the following specification and the accompanying drawings, wherein:

Fig. 1 is a vertical section of a filter installation embodying the invention showing the valving arrangement in "engine off" position;

Fig. 2 is a view of another filter installation partially in vertical section and also embodying the invention and also showing the valving arrangement in "engine off" position;

Fig. 3 is a fragmentary sectional view of the valving arrangement and adjacent parts showing the position and condition of the arrangement during normal engine operation; and Fig. 4 is a view similar to that of Fig. 3 showing the position and condition of the valving arrangement when operating with a clogged filter.

Referring to Fig. 1, a typical full-flow filter installation 10 embodying the invention is shown as affixed to an engine block 11 which has therein a conventional main oil delivery channel, duct or passageway 12 connected to the pump and a conventional oil transmitting channel, duct or passageway 13 leading to engine parts that are to be lubricated.

The filter installation 10 is supported by its base 15 which is of metal or other suitable material, said base being secured to the engine block 11 in relationship to the respective ducts 12 and 13 as will be hereinafter described. An upwardly extending cylindrical cup member 16 having an upper peripheral rim 17 is provided on the base 15. This cup member 16 defines a filter chamber 18 which may be closed by an inverted cup-shaped cover 19 having a peripheral rim 20 which latter is adapted to rest upon a sealing gasket 21 mounted on the rim 17. The cover 19 and cup member 16 are clamped together as by a removable U-shaped ring-clamping means 22 of conventional construction which is tightened into clamping position as by a bolt 23 and nut 24 as seen in Fig. 2.

The cup member 16 is provided with a central upwardly extending annular ledge 25 (see Fig. 1). Coaxial with and supported within the ledge 25 is a tube 26 which has perforations 27 in its side wall for purposes presently to be described. A second tube 28 is supported in base 15 being coaxially positioned within the first tube 26 and defining an annular space 29 therewith. The upper end of the said annular space 29 is closed off by an upper end wall 30. The upper end of tube 28 communicates with the chamber 18 through an opening 31 in said upper end wall 30. The lower end of annular space 29 communicates with a horizontally disposed channel, duct or passageway 32 in the base 15. The duct 32 in turn is aligned with and communicates with the engine block duct or passageway 13. The lower end of the innermost tube 28 communicates with a horizontally disposed channel, duct or passageway 33 in said base 15. Another horizontally disposed channel, duct or passageway 34 in the base 15 communicates with the engine block channel, duct or passageway 12. A vertically disposed shunt channel, duct or passageway 35 interconnects the two horizontal ducts or passageways 32 and 34. The duct or passageway 33 opens into the vertical passageway 35.

A filter element 36, for example, of the kind described in U. S. Patents Nos. 2,642,187 and 2,642,188, both issued June 16, 1953, is coaxially mounted on the tube 26. The element 36, as is more fully described in the said two patents, includes a body of filtering material 37, top and bottom end discs 38 and 39, and an inner perforated center tube 40 around which the filtering material 37 is disposed. This filter element is coaxially positioned on the tube 26 in chamber 18 and its lower end disc 39 rests on the annular ledge 25. A spring 41 interposed between the upper end disc 38 and the inner face of cover 19 maintains the filter element 36 in the position just described. Other conventional types of filter elements may be utilized instead of the filter element 36.

Slidably mounted in the shunt passageway 35 is a valve arrangement or structure 42 which is seen in greater detail in Figs. 3 and 4. This valve structure 42 comprises a tubular valve sleeve 43 which is shorter than and which is slidable axially in the shunt passageway 35. The upper end edge of said sleeve is tapered at portion 44 (see Fig. 2) for seating in one position of the valve sleeve on a valve seat 45 provided at the upper end of passageway 35. The lower edge of the sleeve 43 is also tapered at portion 46 to provide a seal in a second position of the valve sleeve when engaged with the inner periphery of a flexible ring member 47 of rubber or like material which is mounted in an annular groove 48 provided in the wall of shunt passageway 35 adjacent its lower end. The sleeve valve 43 is thus shiftable between a pair of spaced apart valve seats 45 and 47.

A disc-like metallic sealing member 49 (see Figs. 3 and 4) is mounted on a pin or shaft 50. The shaft 50 extends coaxially with the valve sleeve 43. A compressed coil spring 51 is located within the sleeve 43. This spring 51 surrounds the shaft 50 and is compressed between an annular inwardly directed shoulder 52 of the sleeve and the head 54 at the lower end of pin or shaft 50. The spring 51 thus normally biases the sealing member 49 into sealing engagement against a seat 55 defined around the upper opening 56 of the sleeve 43. Spring 51 is compressed to any desired extent to provide desired loading bias of sealing member 49 against its seat 55. For example, this loading bias may be one of ten pounds per square inch. Other values may be selected.

A removable threaded plug 57 axially aligned with the passageway 35 is threadedly secured in a wall of base 15. Removal of this plug 57 permits access to shunt passageway 35 and installation into it of valve structure 42 and resilient valve ring 47 or their removal therefrom if necessary.

The base 15 of the filter installation 10 is attached to the engine block 11 as by the bolts 58 so that channels, ducts or passageways 32 and 34 in said base are aligned, respectively, with the channels, ducts or passageways 13 and 12 of the engine block 11. A sealing gasket 59 is interposed between the adjacent faces of the block 11 and base 15.

*Operation*

Operation of the arrangement hereinabove described is substantially as follows:

When the engine is not running there is no oil pressure in the ducts or passageways 12 or 34. Then the valve structure 42 because of the action of gravity lies in lowermost position as seen in Fig. 1 wherein the lower tapered end 46 of sleeve 43 is in sealing engagement with the inner periphery of the flexible sealing ring 47. The spring 51 at this time also biases the disc-like sealing member 49 into a closed and sealing position relative to the seat 55 around the upper opening 56 of the sleeve. As a result of the seals provided at ring 47 and at seat 55, oil above the level of the seal at ring 47 is prevented from flowing back to the pump and sump through passageways 34 and 12. In other words, neither oil from any portion of the filter 10 above the level of flexible sealing ring 47 nor back-flowing oil from the engine block coming via ducts or passageways 13 can flow back to the pump or oil sump via passageways 34 and 12.

When the engine is started, oil pressure appears in passageways 12 and 34 and drives the valve structure 42 upwardly in shunt passageway 35 until the tapered end 44 of sleeve 43 is seated on the seat 45 at the upper end of said passageway 35. This seating prevents any oil in the duct passage 35 from by-passing the filter as long as disc-like valve member 49 is also seated under biasing action of spring 51. The loading of spring 51 is sufficient to maintain the seated condition of disc-like valve member 49 unless the oil pressure in shunt passageway or channel 35 exceeds, for example, ten pounds per square inch. At all pressures below such pressure (or any other desired and selected pressure), the oil flows from the pump (not shown) through the channels, ducts or passageways 12, 34, 35 and 33, through the innermost tube 28 and out of its uppermost end via opening 31 into the filter housing chamber 18. After filling the latter, the oil is forced to flow from the chamber 18 inwardly through the filter body 37 of the element 36, and perforated filter tube 40 and via perforations 27 of the tube 26 into the annular space 29 between tubes 26 and 28. In its passage through the components of the filter element 36 as just described, the impurities in the oil are trapped by the filter body 37 and the filtered oil reaching annular space 29, flows via passageways 32 and 13 to the engine block 11 for lubrication purposes.

During use, as the filter element 36 becomes highly clogged, it becomes increasingly more difficult to force flow of oil through the filter body 37. A back pressure, therefore, builds up in the passageways or ducts 33 and 35. When clogging is sufficient to create a back pressure in shunt duct 35 in excess, in this instance, of the ten-pound loading of spring 51, the excess pressure overcomes the seating action of spring 51 and moves the disc-like valve member 49 away from its seat 55 as seen in Fig. 4, thereby uncovering the sleeve opening 56. When this occurs, relief or by-pass flow of oil directly from the passageway 34 into the passageway 32 will occur via shunt passageway 35 and the clogged filter will be by-passed. Such by-pass flow will continue until the clogged filter element 36 is replaced.

When the engine is stopped, oil pressure from the pump ceases. The valve structure 42 drops back under gravity to its initial position promptly and prevents back-flow or drain-back of oil to the pump via passageways 34 and 12 because of the seal then established at ring 47 and of the reseating of element 49 under action of spring 51. Since back-flow or drain-back to the sump and pump from the filter and engine are prevented automatically by the valve structure 42, there always is sufficient oil available for lubrication of moving parts of the engine immediately upon starting of the engine even if the engine has been shut down or idle for a long period of time.

A modified embodiment of the arrangement described is illustrated in Fig. 2 wherein all parts which are identical with corresponding parts of Fig. 1 are similarly numbered. In this embodiment the valve structure 42 which eliminates drain-back is positioned in the engine block 11a rather than in the filter base. As seen in Fig. 2, the base 15a of the filter cup-like member 16 is somewhat different from base 15 of Fig. 1 in that it includes only two channels, ducts or passageways, namely, the channels, ducts or passageways 60 and 61. Duct or passageway 60 communicates with the lower end of the annular space 29 between the tubes 28 and 26. Duct or passageway 61 communicates with the lower end of tube 28.

The base 15a is secured to the engine block 11a by the bolts 58 with sealing gasket 62 between the adjacent faces of the block and base. A channel, duct or passageway 63 in the block 11a is aligned with and in communication with the outlet passageway 60 of the base 15a. This duct or passageway 63 in the block 11a serves to deliver filtered oil to the engine parts for lubrication. A dust or passageway 64 is provided in the engine block 11a and is aligned with and in communication with the base inlet duct 61. A vertically disposed shunt channel, duct or passageway 65 in said block 11a interconnects the two ducts or passageways 63 and 64 and also communicates with the channel, duct or passageway 66 in block 11a that leads from the oil pump P. A valve seat 67 is provided at the upper end of the shunt duct or passageway 65. Valve structure 42 is inserted into passageway 65 and then a resilient ring 68 like the ring 47 is inserted into a groove in the wall of the passageway 65. The seat 67 and the resilient ring 68 function with the valve structure 42 in the same manner as seat 45 and ring 47 of Figs. 1, 3 and 4.

A threaded plug 69 axially aligned with shunt passageway 65 is threadedly secured in the block 11a. Removal of this plug 69 permits access to passageway 65 and installation into it of valve structure 42 and of resilient ring 68 or their removal therefrom if necessary.

*Operation*

The operation of the embodiment of Fig. 2 is substantially identical with that of Fig. 1. The valve structure 42 is seated in sealing relationship on ring 68 when the engine is not running, thus preventing drain-back of oil from passageways 64 or 63 to pump passageway 66.

When the engine is started the valve structure 42 is forced upwardly by oil pressure in passageway 66 created by the pump P and into seating position against seat 67 at the upper end of passageway 65. The components of valve structure 42 then are in the same condition as that shown in Fig. 3. Oil from passageway 68 then is free to flow to the filter housing 16 via passageways 64, 61 and tube 28, and after filtration to emerge via annular space 29, into passageway 60, and thence flow into engine block transmitting passageway 63 for lubrication of engine parts.

If clogging occurs in the filter the build-up of back pressure as before described causes the by-pass valve member 49 of the valve structure 42 to open in the same way as shown in Fig. 4 allowing by-pass flow of oil from passageway 66 to passageway 63 via shunt passageway 65 irrespective of the fact that the sleeve 43 of the valve structure 42 is seated against seat 67.

When the engine is stopped the valve structure 42 returns by gravity to its lowermost position in seating relationship of its sleeve 43 relative to resilient ring 68 and drain-back or return flow of oil from the filter or engine parts to the pump P is again prevented.

It is readily seen, therefore, that this invention provides a simple and efficient arrangement for effecting the dual functions of preventing drain-back of engine lubricating oil into the pump and sump when the engine is at rest and of permitting the by-passing of a clogged filter element. In consequence the engine is guarded against possibilities of damage by reason of insufficiency of lubricant, which insufficiency may occur as a result either of drain-back of oil to the pump of a stopped engine, or of clogging of a filter of a running engine.

While specific embodiments of the invention have been disclosed, variations in structural detail within the scope of the appended claims are possible and are contemplated. There is no intention of limitation, therefore, to the exact details shown and described.

What is claimed is:

1. In a full-flow lubricating oil filter for an internal combustion engine including an oil inlet, an oil outlet, and a replaceable filter element, that improvement which comprises a first channel leading to the inlet, a second channel leading from the outlet, a third channel interconnecting said first and second channels, and a slide valve mounted in said third channel, said valve being positioned automatically to prevent back drainage from the filter via said inlet and said first channel when the engine is at rest, and including spring biased pressure-responsive means in said slide valve to permit oil to by-pass said element between the inlet and outlet by flow through said slide valve when the element has become clogged.

2. In a full-flow lubricating oil filter system for an internal combustion engine including an oil pump, a filter above said pump, a filter element, and a channel connecting the inlet and outlet sides of the filter, a slide valve mounted in said channel and movable therein under action of gravity to a position to prevent flow of oil past it from the filter when the engine is at rest, said valve including sealing means for preventing by-passing of the filter element of oil pumped to the filter by the pump during normal engine operation, said sealing means being pressure responsive to permit by-passing of the element by pumped oil when the element becomes clogged.

3. In a full-flow lubricating oil filter system for an internal combustion engine including an oil pump, a filter above said pump, a filter element and a channel connecting the inlet and outlet sides of the filter, a slide valve mounted in said channel and movable therein under the action of gravity to a position to prevent flow of oil past it from the filter when the engine is at rest, said valve including sealing means for preventing by-passing of the filter element of oil pumped to the filter by the pump during normal engine operation, and spring loading means for said sealing means, said spring loading means being overcome by oil pressure when said filter becomes clogged to then permit by-passing of said filter element by the pumped oil.

4. In an automotive engine including an engine block, an oil pump and a full-flow filter installation mounted on said block, said block and said filter installation having a pair of interconnected ducts for transmission of oil upwardly from the pump to the filter installation and a pair of interconnected ducts for delivery of filtered oil from the filter installation to the engine for lubrication of parts thereof, a shunt duct connecting said two pairs of ducts, valve seating means at spaced apart locations within said shunt duct in proximity to its opposite ends, combination valve means movable within said shunt duct between the spaced apart seating means and serving when seated upon one of said seating means to prevent drain-back of oil from the filter installation and engine parts to the pump when the engine is at rest, and being movable into seating relationship against the other seating means when the engine is running to effect flow of pumped oil to the filter installation for filtration, said combination valve means including a by-pass valve member adapted to open in the latter named relationship of said combination valve means to permit by-pass flow of pumped oil to the engine when the filter installation is clogged.

5. In combination with an engine block having an oil delivery duct for delivery of lubricating oil under pressure from an oil pump and an oil transmitting duct for transmitting of pumped oil to engine elements to be lubricated, said ducts having respectively delivery duct and transmitting duct openings in a face of said block, a full-flow lubricating oil filter comprising a base attached to said engine block over said openings in the face of the block and having filter input and output channels aligned respectively with the delivery duct opening and with the transmitting duct opening, said base having a shunt channel interconnecting said input and output channels, valve seating means at spaced apart locations in said shunt channel in proximity to its opposite ends, an additional channel communicating with said shunt channel and serving to lead pumped oil from the input channel into the filter for filtration, and said output channel serving to transmit pumped and filtered oil from the filter to said transmitting duct, a slidable valve within said shunt channel, said valve when the engine is at rest being seated upon one of said seating means to prevent drain-back of oil from the filter and engine to the oil delivery duct and back to the pump, and said valve when said engine is running being seated upon the other of said seating means to effect flow of pumped oil from the delivery duct and via said input channel and said additional channel through said filter for filtration unless said filter is clogged, and normally closed pressure responsive sealing means in said valve which opens when said filter becomes clogged to permit direct by-pass flow of pumped oil between the input and output channels via said shunt channel.

6. In an automotive engine comprising an engine block, an oil pump, a full-flow lubricating filter installation including a filter mounted on said block above said pump, said filter and block having intercommunicating passageways for delivering pumped oil to an inlet to the filter, and having intercommunicating passageways for transmitting pumped and filtered oil from the filter to engine parts for lubrication, and having a shunt passageway between the first and second named intercommunicating passageways, valve seats at spaced apart points in said shunt passageway in proximity to its opposite ends, slidable valve means movable within said shunt passageway and acting in a first position to provide a seal with one of said valve seats and prevent drain-back of oil from the engine and filter to the pump when the engine is at rest via the first named intercommunicating passageways, and said slidable valve means acting in a second position to provide a seal with the other of said valve seats to thereby direct pumped oil delivered by said pump for flow through said filter, and a spring-biased normally-seated valve member in said slidable valve means adapted to be unseated by pumped oil pressures occurring when clogged filter conditions exist to permit by-pass of flow of pumped oil to the engine without passage through the filter when the latter is clogged.

7. In an automotive engine including an engine block, an oil pump and a full-flow filter installation mounted on said block, said block and said filter installation having a pair of interconnected ducts for transmission of pumped oil to the filter installation and a pair of interconnected ducts for delivery of pumped and filtered oil from the filter installation to the engine for lubrication of parts thereof, a shunt duct joining said two pairs of ducts, valve seating means at a first location in said shunt duct adjacent the junction of said shunt duct with said second named pair of ducts, valve seating means at a second location in said shunt duct adjacent the junction of said shunt duct with the first named pair of ducts, sleeve valve means slidable within said shunt duct between said two valve seating means, and being movable by gravity when the engine is at rest into seating relationship with the valve seating means at said second location to prevent drain-back of oil from the filter installation and engine parts to the pump, said sleeve valve means including a spring-biased normally closed by-pass valve member whereby when said engine is running said sleeve valve will be moved in said shunt duct into seating relationship with the first named valve seating means by incoming pressure of pumped oil and effect flow of pumped oil through the filter installation for filtration, said spring-biased, normally-closed by-pass valve member opening when back pressures of pumped oil caused by clogging of the filter installation exceed the spring biasing of said by-pass valve member to then permit by-pass flow of pumped oil through the shunt duct directly between the said two pairs of ducts thereby by-passing the clogged filter installation.

8. For use with an engine block having an oil delivery duct for delivering lubricating oil pumped from an oil pump and a transmitting duct for transmittal of filtered oil to engine elements to be lubricated, said ducts having respectively delivery and transmitting duct openings in a face of the engine block, a filter installation comprising a base for attachment to the engine block over the said openings in the face of the block and having filter input and output channels aligned respectively with the delivery and transmitting duct openings, said base having a shunt duct interconnecting said two channels, valve seats at spaced apart points in said shunt duct in proximity to its opposite ends, sleeve valve means movable in said shunt duct between said valve seats into seating relationship in a first position with one of said valve seats and in a second position with the other of said valve seats and a normally closed by-pass valve means in said sleeve valve means, said sleeve valve means being gravity actuated into its said first position when the engine of which said block is part is stopped and thereby preventing drain-back of oil from the engine and the filter installation to the pump via said oil delivery duct, said sleeve valve being shifted by pumped oil pressure in the delivery duct to its second named position when the engine is operating to admit pumped oil from said delivery duct to the filter installation for filtration therein and to effect subsequent delivery of filtered oil from the filter installation to the transmitting duct, and said by-pass valve means being operable by pumped oil pressure above a determined value to establish a direct passage for pumped oil through the shunt duct between the delivery and transmitting ducts to by-pass the filter installation when the latter is clogged.

9. In an automotive engine comprising an engine block and an oil pump, said block being above the pump and having a delivery passageway for delivering pumped oil for lubrication, and having a transmitting passageway for transmitting filtered oil to engine parts for lubrication and having a shunt passageway between said delivery and transmitting passageways, said transmitting passageway opening into a face of said block, said block having an additional passageway communicating with said shunt passageway and opening into said face of said block, a filter installation including a filter and a base member secured to said block, said base member having an inlet passageway communicating with said additional passageway at the face of said block and an outlet passageway communication with said transmitting passageway at the face of said block, valve seats at spaced apart points in said shunt passageway in proximity to its opposite ends, slidable valve means movable within said shunt passageway and acting in a first position to provide a seal with one of said valve seats and thereby prevent drain-back to the pump of oil from the filter via said shunt passageway and said delivery passageway, and said slidable valve means acting in a second position to provide a seal with the other of said valve seats to thereby direct pumped oil delivered for flow through the filter via the shunt passageway, said additional passageway and said inlet passageway for filtration and subsequent flow from said outlet passageway to said transmitting passageway, and a spring-biased, normally-seated valve member in said slidable valve means adapted to be unseated by pumped oil pressures occurring in said shunt passageway when said filter becomes clogged to then permit by-pass flow of pumped oil from the delivery passageway to the transmitting passageway via said shunt passageway and thereby by-pass the clogged filter.

References Cited in the file of this patent

UNITED STATES PATENTS

| | | |
|---|---|---|
| 1,720,475 | Hewitt | July 9, 1929 |
| 1,844,611 | Spackman | Feb. 9, 1932 |
| 2,108,798 | Dalrymple | Feb. 2, 1938 |